(12) United States Patent
Foster

(10) Patent No.: US 9,869,350 B2
(45) Date of Patent: Jan. 16, 2018

(54) POSITIONING DEVICE

(71) Applicants: Bürkert Contromatic Corp., Charlotte, NC (US); Bürkert Werke GMBH, Ingelfingen (DE)

(72) Inventor: Daniel L. Foster, Charlotte, NC (US)

(73) Assignees: Bürkert Contromatic Corp., Charlotte, NC (US); Bürkert Werke GMBH, Ingelfingen (DE)

(*) Notice: Subject to any disclaimer, the term of this patent is extended or adjusted under 35 U.S.C. 154(b) by 77 days.

(21) Appl. No.: 14/944,887

(22) Filed: Nov. 18, 2015

(65) Prior Publication Data

US 2016/0138731 A1    May 19, 2016

Related U.S. Application Data

(60) Provisional application No. 62/081,274, filed on Nov. 18, 2014, provisional application No. 62/128,629, filed on Mar. 5, 2015.

(51) Int. Cl.
| | | |
|---|---|---|
| *F16K 27/08* | (2006.01) | |
| *F16C 33/06* | (2006.01) | |
| *F16C 29/04* | (2006.01) | |

(52) U.S. Cl.
CPC .............. *F16C 33/06* (2013.01); *F16K 27/08* (2013.01); *F16C 29/046* (2013.01)

(58) Field of Classification Search
CPC ........ F16K 27/08; F16K 31/46; F16K 31/465; F16C 9/06; F16C 33/06; F16C 33/046; F16C 33/30; F16C 33/3706; F16C 29/046; F16C 29/06; F16C 29/0607; F16C 31/06; F16C 19/02; F16C 19/08; F16C 21/00; Y10T 137/6069; Y10S 384/905

USPC ........ 251/214, 294, 297; 384/14, 20, 24, 28, 384/29, 46, 50, 49, 91, 95, 276, 281, 905; 137/315.28

See application file for complete search history.

(56) References Cited

U.S. PATENT DOCUMENTS

| | | | | |
|---|---|---|---|---|
| 3,992,122 A | * | 11/1976 | Maxey ................. | B23B 29/027 384/49 |
| RE31,445 E | * | 11/1983 | Carter ..................... | F04D 9/00 222/333 |
| 4,555,148 A | * | 11/1985 | de Willigen ........... | F16C 29/00 384/43 |
| 4,844,411 A | * | 7/1989 | Nelson .................... | F16K 41/04 251/214 |
| 4,850,463 A | * | 7/1989 | Lederman ............. | F16D 41/067 192/45.016 |
| 5,176,455 A | * | 1/1993 | Stangeland ............. | F16C 17/22 384/100 |
| 5,236,264 A | * | 8/1993 | Matsubara .............. | F16C 29/04 384/49 |

(Continued)

*Primary Examiner* — Matthew W Jellett
(74) *Attorney, Agent, or Firm* — Williams Mullen, PC

(57) ABSTRACT

A device and approach to ensure acceptable alignment of internal mechanical components requiring bushings. Over wide ranges of temperature, some bushings experience sufficient thermal dimensional change as to misalign or to interfere with other mechanical components. Such bushings may be reduced in size or include a plurality of outer surfaces to avoid interference, and employ ball nose assemblies to maintain acceptable alignment. At full thermal expansion of such a bushing, the ball nose assembly interrelates with the bushing so as to maintain alignment without interference.

17 Claims, 15 Drawing Sheets

(56) References Cited

U.S. PATENT DOCUMENTS

| | | | | |
|---|---|---|---|---|
| 5,538,346 | A * | 7/1996 | Frias | F16C 29/046 |
| | | | | 193/35 MD |
| 6,167,902 | B1 * | 1/2001 | Nelson | F16K 31/50 |
| | | | | 137/315.28 |
| 6,200,225 | B1 * | 3/2001 | Hobaugh, II | F16C 3/035 |
| | | | | 384/49 |
| 6,343,993 | B1 * | 2/2002 | Duval | B62D 1/16 |
| | | | | 384/49 |
| 6,478,466 | B1 * | 11/2002 | Chang | F16C 29/04 |
| | | | | 312/334.17 |
| 7,377,695 | B2 * | 5/2008 | Qiu | F16C 19/54 |
| | | | | 378/132 |
| 8,253,292 | B2 * | 8/2012 | Kamio | F16C 19/52 |
| | | | | 310/90 |
| 2002/0186902 | A1 * | 12/2002 | Leasure | F01L 1/46 |
| | | | | 384/49 |
| 2011/0129327 | A1 * | 6/2011 | Habibvand | F04B 15/08 |
| | | | | 415/1 |
| 2015/0226338 | A1 * | 8/2015 | Hunter | F16K 39/04 |
| | | | | 251/214 |

* cited by examiner

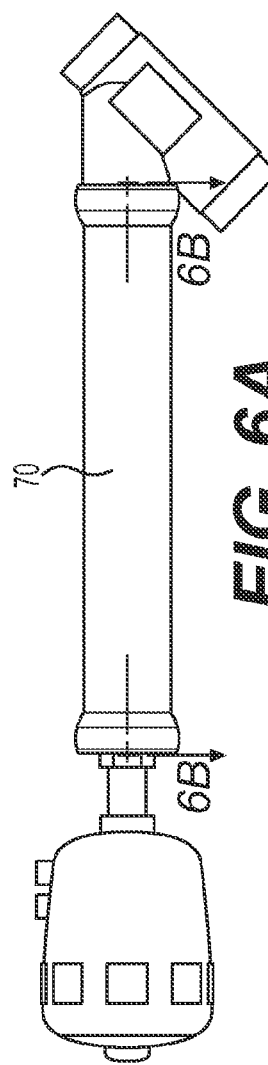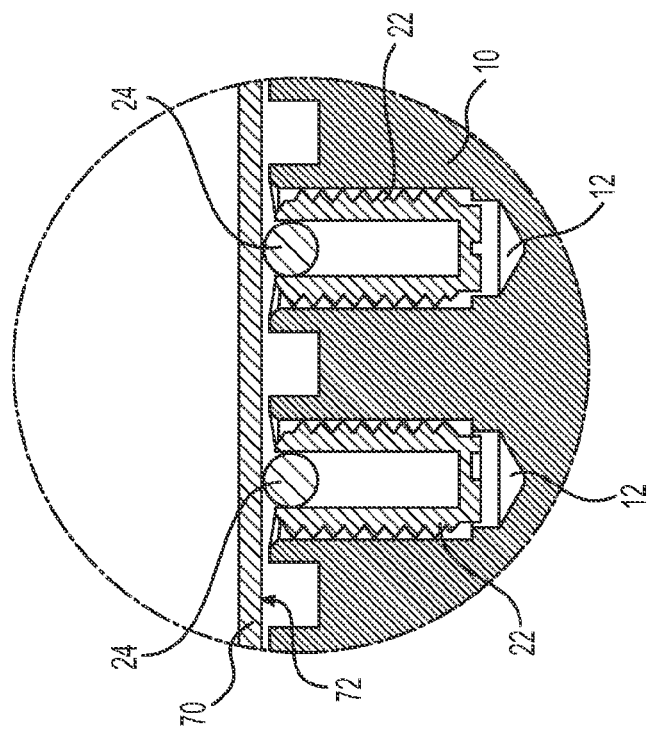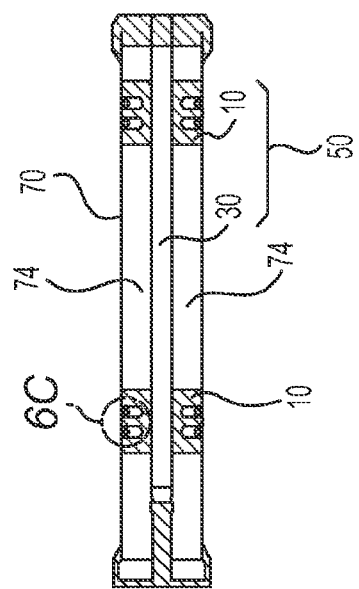

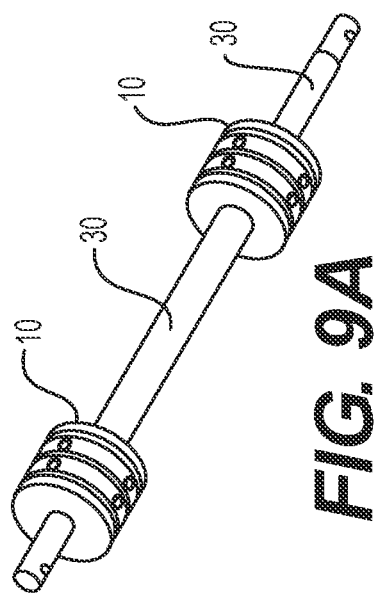
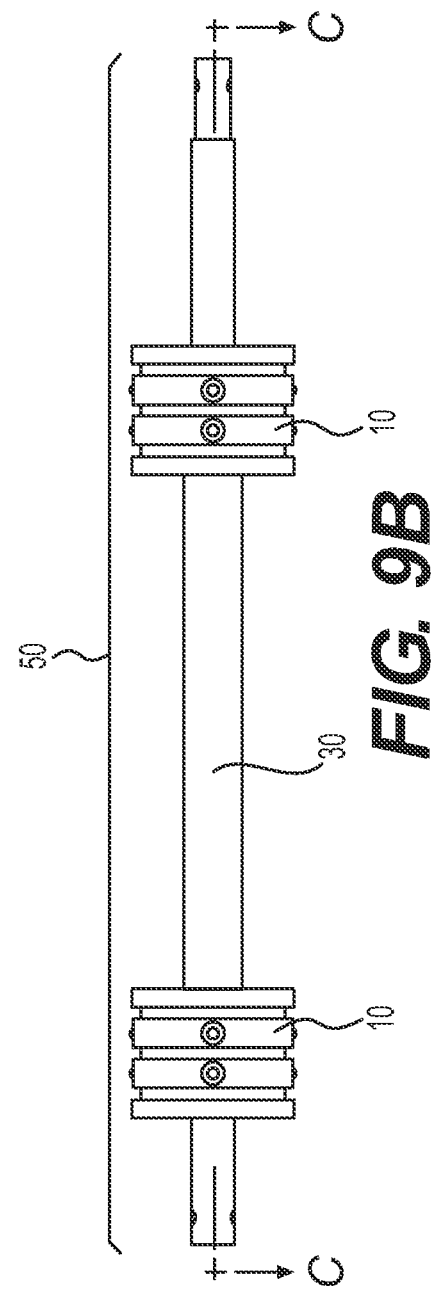
FIG. 9A
FIG. 9B

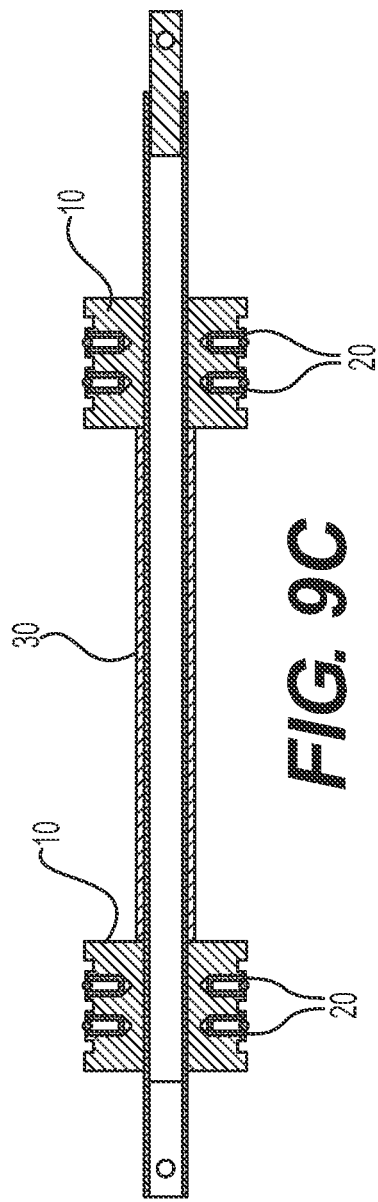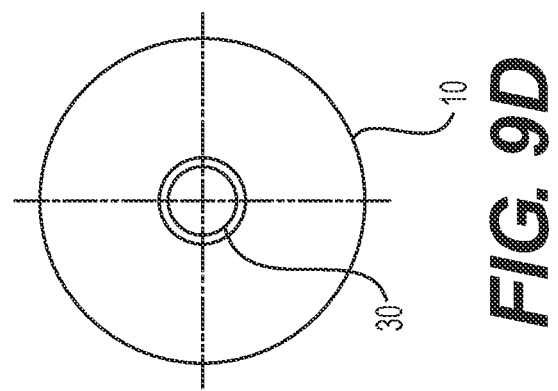

POSITIONING DEVICE

CROSS-REFERENCE TO RELATED APPLICATIONS

This application claims the benefit of U.S. Provisional Application No. 62/081,274, filed Nov. 18, 2014 and U.S. Provisional Application No. 62/128,629, filed Mar. 5, 2015, both of which are hereby incorporated in their entirety.

STATEMENT REGARDING GOVERNMENT SUPPORT

None.

FIELD OF THE INVENTION

The present device relates to precision parts within devices having components subject to varied levels of thermal expansion and, more particularly, such a device for use as stem or spindle guide bushing in valves directed to cryogenic and steam applications.

BACKGROUND

Cryogenic valves are generally designed to function in the extremely cold temperatures of cryogenic fluids, such as liquid nitrogen. Most components of such valves are fabricated from stainless steel. It is common to find cryogenic valves designed with features that protect their components from the effects of the fluid. For example, some cryogenic valves have stem packing that is positioned beyond a point of insulation. Another example is the use of an extended valve bonnet that enables thermal conduction; cryogenic fluid that might escape into the bonnet is thus able to warm and vaporize. Such features can enhance the reliability of valve components.

However, such features can also introduce design challenges. The extended bonnets common in cryogenic valves house valve stems or spindles, which operably engage with some form of valve actuator and the fluid sealing portion of the valve. Within the bonnet, the stem or spindle is often maintained in position by a guide bushing. Like the bonnet, the spindle is often extended. Commonly, the material polytetrafluroethylene (PTFE) is used for guide bushings; the guide bushing controls the extended spindle for proper alignment, which aids in the proper operation and sealing of the valve. PTFE has a low coefficient of friction, and is generally both tough and suitable for use at cryogenic temperatures, rendering it an industry standard material for such purposes.

Cryogenic valves are commonly rated for a temperature range between the desired temperatures of the cryogenic fluid to that of ambient temperature. For an application or use limited to liquid nitrogen, the cryogenic fluid system may experience a change or delta in temperature of around 350 degrees Fahrenheit.

Industrial applications for fluid cryogenic systems include diverse fields such as power generation, fuels, food service, research, health applications (magnetic resonance imaging), etc. A subset of these applications requires, at different times, the use of both steam and cryogenic fluid within the same fluid system. For example, both steam and cryogenic fluids are highly used in the food industry for the rapid heating and cooling of food. For a liquid nitrogen and steam application, the fluid system may experience a change or delta in temperature of around 700 degrees Fahrenheit.

PTFE (e.g., appr. $100 \times 10^{-6}$ mm/mm*C) has a larger coefficient of thermal expansion than austenitic stainless steel (e.g., appr. $18 \times 10^{-6}$ mm/mm*C), though actual values vary by composition and temperature range of measurement. Some PTFE may experience a linear thermal expansion on the order of 5% over a large delta increase or range of temperature. According to some suppliers, PTFE exhibits a significant change in a critical transition zone of 65-77 degrees Fahrenheit, with a volumetric change there of about 1.0-1.8% alone. For operating conditions exclusively on either side of this transition zone, precision parts may be produced while under the temperature conditions similar to that of use to avoid such a change. However, a broad range of 700 degrees Fahrenheit overlapping both sides of the transition zone renders volumetric changes unavoidable.

A PTFE component will generally shrink or expand to greater extent than a stainless steel component. In a conventional cryogenic valve, the greater shrinking in extremely low temperatures and expansion at higher, ambient temperatures may be accommodated, but may not be ideal.

In a cryogenic valve subject to the temperatures of cryogenic fluid and steam, the thermal expansion characteristics may be too severe. For example, as a bushing within a cryogenic valve, the tolerances of the finished part vary far too much during that temperature range to maintain proper alignment of the plug and valve seat. In practice, the use of conventional PTFE bushings over such a broad range of temperature has resulted in broken stem or spindle assemblies. The PTFE bushing fabricated to tolerances for proper alignment will expand to such an extent as to encounter the lesser expanding stainless steel valve body.

A device or design permitting the use of precision parts in such steam and cryogenic fluid systems would desirably overcome this problem. A material matching the thermal expansion characteristics of austenitic stainless steel would ideally solve many of the problems of PTFE bushings. A stainless steel bushing on a stainless steel bonnet generally creates too much friction which can lead to galling of the two components. As a result, improvements in the field are desired.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

The present approach involves a bushing design of such proportion that even at the maximum extent of thermal expansion, interference of a cryogenic valve bushing and other valve structure, such as the bonnet, is avoided. In one embodiment, the present size and shape of the bushing is designed to handle the extremes of hot and cold temperatures, and allow for an exchange with a valve bonnet that minimizes interference and friction. With no other compensation or adjustment, though, this approach would lead to improper alignment of the plug and valve seat at some temperatures.

In addition to the foregoing, one of the present embodiments includes a mechanism or device for maintaining the proper alignment of a bushing with valve structure should the bushing expand or contract to a size that might risk misalignment. At full thermal expansion of the bushing, the device inter-relates with the bushing such that the valve components do not interfere.

Embodiments or applications of the present approach may be directed to a cryogenic valve assembly. Such an assembly may generally involve a valve bonnet, a stem, and a guide bushing, each with various subcomponents or aspects. The valve bonnet may have or be configured with an inner surface that defines an inner passage; the inner passage may extend for a passage length along a first axis and a passage width along substantially orthogonal transverse second and third axes. A valve stem may be configured or sized to be movably disposed within the inner passage of the valve bonnet. The valve stem may extend or have a stem length along the first axis, and be configured to operably move relative to the first axis; the valve stem may have a transverse stem width that is less than the passage width. A guide bushing may be disposed or affixed onto or about the valve stem. The guide bushing may have a transverse bushing width that is greater than the stem width, but less than the passage width so as to define a transverse gap between the guide bushing and the bonnet inner surface. The guide bushing may generally be a body having or defining at least one outer surface facing at least a portion of the inner surface of the bonnet. One or more ball nose assemblies may be at least partially disposed or installed in at least one of the plurality of outer surfaces of the bushing. At least a portion of said ball nose assembly extends at least partially into the transverse gap. The guide bushing may be made from stainless steel, PTFE, or other suitable material.

The ball nose assembly may include a body, a bearing point, and a resilient element, such as a body with an interior annulus with a spring and detent ball. The bearing point, in some embodiments, may thus be a bearing ball configured to make contact with said inner surface of said valve bonnet.

In some embodiments of the cryogenic valve assembly, the at least one outer surface of the bushing may present or include a plurality of outer surfaces. Optionally, the at least one ball nose assembly may include a plurality of ball nose assemblies with each ball nose assembly disposed in a separate one of said plurality of outer surfaces.

In some embodiments, the plurality of ball nose assemblies may be distributed transversely about the first axis within the plurality of outer surfaces of a guide bushing. Optionally, the guide bushing may have a transverse shape of a square with four chamfered or excised corners, so that the plurality of outer surfaces form four outer surfaces at the chamfered corners and the plurality of ball nose assemblies comprise four ball nose assemblies spaced or installed radially 90-degrees apart at the chamfered corners.

In another option, the stem may be configured to operably move relative to the first axis by translation along the first axis, and wherein the bearing point may be a bearing ball configured to make contact with the inner surface of the valve bonnet such that the plurality of ball nose assemblies are configured to maintain a desired transverse alignment of the valve stem relative to said bonnet. Alternatively, the movement may be by rotation about the first axis. Optionally, the valve assembly may be configured so that when the stem and guide bushing undergo thermal contraction, the bearing balls extend into said transverse gap so as to maintain the desired proper alignment of the valve stem. In some configurations, the proper alignment may be maintained over an operational temperature range of at least about 750 degrees Fahrenheit.

Some embodiments may be directed to a valve stem sub-assembly. Such a subassembly may be for use in a cryogenic valve, such as a cryogenic valve having a valve bonnet with an inner surface. Embodiments of the valve stem sub-assembly may include a valve stem having a stem length along a first axis and a transverse stem width along substantially orthogonal transverse second and third axes. The sub-assembly may also include a guide bushing affixed to or mounted on or about the valve stem. Such a guide bushing may have a transverse bushing width greater than the stem width so as to be arranged transversely about the stem. The guide bushing may have or present at least one outer surface along the first axis and a transverse axis. A plurality of ball nose assemblies may be at least partially disposed in the at least one outer surface. The plurality of ball nose assemblies may include a body, a bearing point, and a resilient element, with the bearing point extending radially outward beyond the outer surface of the guide bushing. The plurality of ball nose assemblies may be configured so that the bearing point may contact the inner surface of the valve bonnet to maintain transverse alignment of the valve stem. Optionally, the plurality of ball nose assemblies may be three ball nose assemblies spaced radially 120-degrees apart in the bushing. Alternatively, the plurality of ball nose assemblies may be four ball nose assemblies spaced radially 90-degrees apart. Embodiments of the sub-assembly may include a guide bushing with a transverse shape of a square with four chamfered corners. In such an embodiment, the plurality of outer surfaces may form four outer surfaces at the chamfered corners, with the plurality of ball nose assemblies being four ball nose assemblies spaced radially 90-degrees apart at or installed into the chamfered corners. In such embodiments, the guide bushing may be made from stainless steel, PTFE, or other material suited to the application.

Some embodiments may be directed to a stainless steel guide bushing for use in a cryogenic valve. Similar to the above, such a cryogenic valve may have a valve bonnet with an inner surface that defines an inner passage. The inner passage may extend or have a passage length along a first axis and a passage width along substantially orthogonal transverse second and third axes. The cryogenic valve may also include a valve stem sized to be movably disposed within the inner passage of the valve bonnet, the valve stem having a stem length along the first axis and configured to operably move relative to the first axis, the valve stem having a transverse stem width less than the passage width.

In such embodiments, the guide bushing may be configured to be disposed on the valve stem, with the bushing having a transverse bushing width greater than the stem width and less than the passage width so as to define a transverse gap between the guide bushing and the bonnet inner surface. The guide bushing may present or include a plurality of outer surfaces facing at least a portion of the inner surface of the bonnet. A ball nose assembly may be at least partially disposed in at least one of said plurality of outer surfaces. A portion of said ball nose assembly may be configured to extend at least partially from the outer surfaces of the bushing and into the transverse gap. Optionally, the ball nose assembly may include a body, a bearing point, and a resilient element, with the resilient element mounted within an interior of the body. The bearing point may be moveably mounted within the body interior at a point outward of said resilient element. Optionally, the stainless steel guide bushing and ball nose assembly may be configured such that when the stem and guide bushing undergo thermal contraction, the bearing point is configured to extend into the transverse gap so as to maintain a proper alignment of the valve stem. The bushing and ball nose assembly may be configured to maintain this alignment over an operational temperature range of at least about 750 degrees Fahrenheit.

In some embodiments, a cryogenic valve assembly includes a valve bonnet having an inner surface, a valve stem sized to be disposed within the valve bonnet, a guide bushing arranged on the valve stem, said guide bushing comprising a plurality of outer surfaces, and a ball nose assembly at least partially disposed in at least one of said plurality of outer surfaces, wherein at least a portion of said ball nose assembly extends at least partially into a gap formed between the inner surface of the valve bonnet and the guide bushing when the guide bushing is inside the valve bonnet In some embodiments, a cryogenic valve assembly includes a valve stem, a stainless steel guide bushing arranged on the valve stem, said guide bushing including at least one outer surface, and a plurality of ball nose assemblies extending radially outward beyond said at least one outer surface of said guide bushing, wherein said plurality of ball nose assemblies are configured to maintain alignment of the valve stem.

In some embodiments, a stainless steel guide bushing for use with a cryogenic valve stem, the bushing includes a plurality of outer surfaces, a ball nose assembly extending radially outward from at least one of said plurality of outer surfaces, said ball nose assembly comprising a body, a bearing point, and a resilient element, said resilient element mounted within an interior of said body, said bearing point moveably mounted within said body interior at a point outward of said resilient element.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIGS. 6A-6C are schematic views of a cryogenic valve with several details according to some embodiments.

FIGS. 9A-9D are schematic views of valve spindles with bushings according to some embodiments.

DETAILED DESCRIPTION

Figure 1:
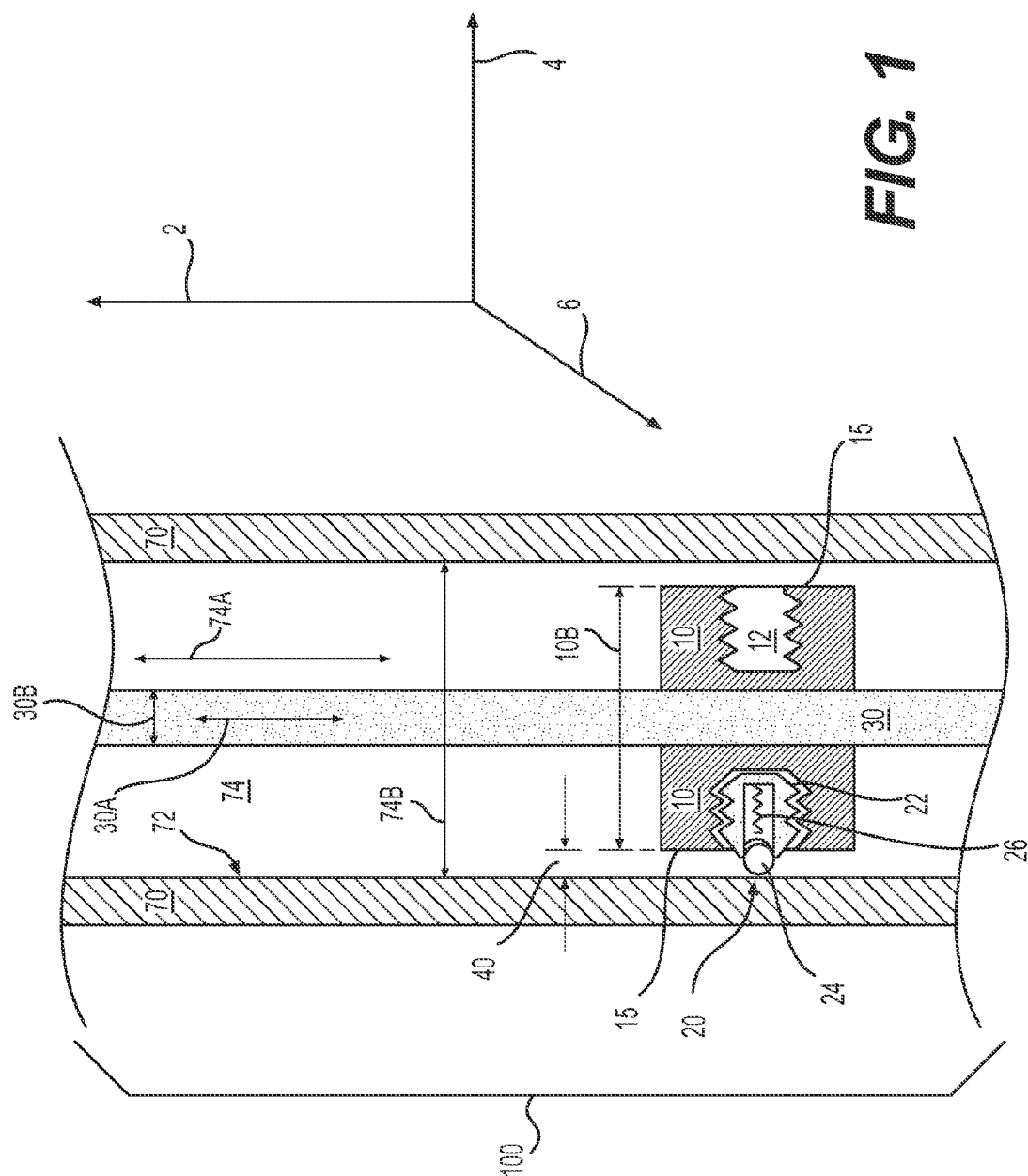
FIG. 1 is a cross sectional view of an embodiment of the present assembly and illustrates axes of reference.
Figure 2:
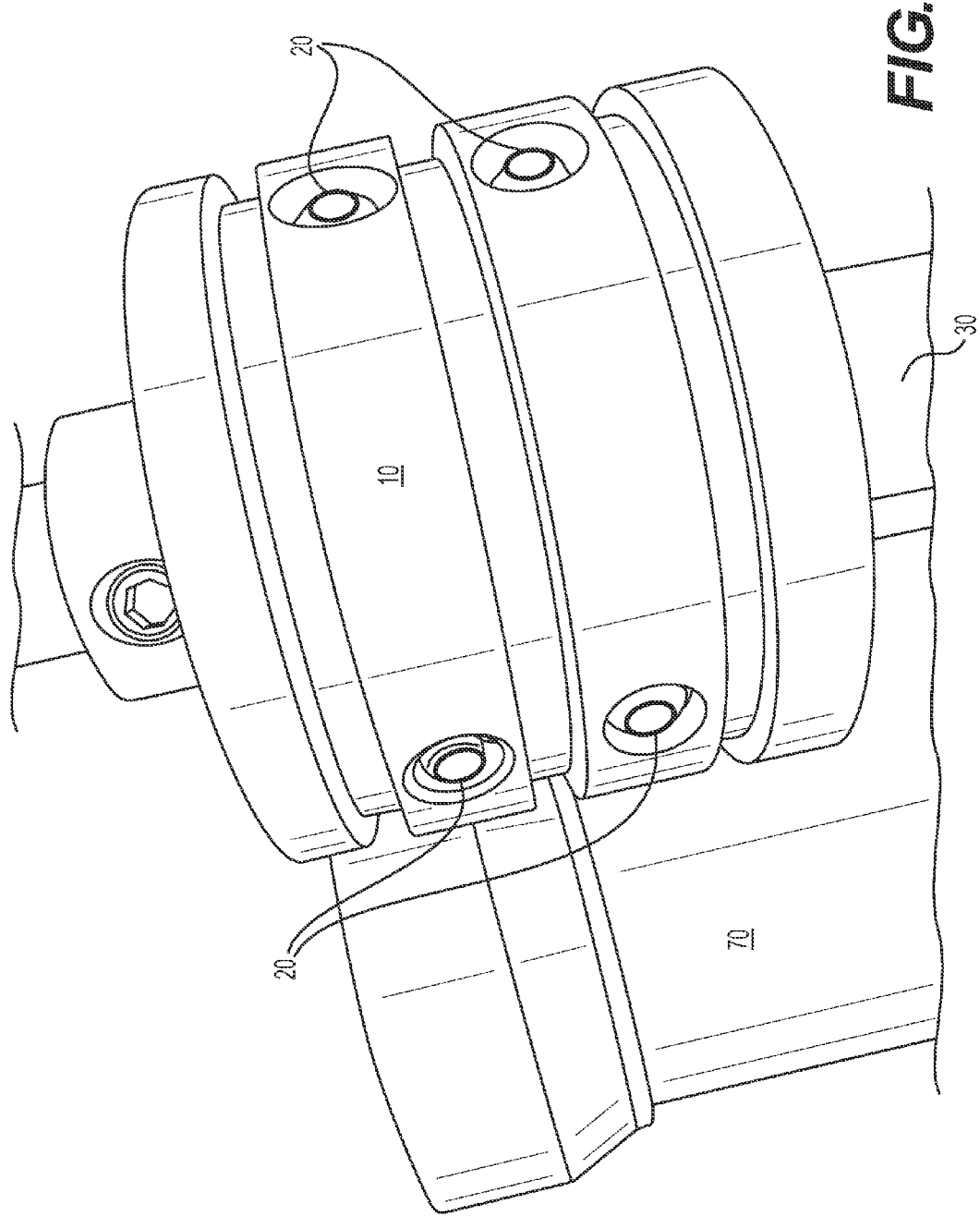
FIG. 2 is a close-up view a bushing and assemblies according to some embodiments.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" or "disposed on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "affixed", "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations in use or operation in addition to the orientation depicted in the figures.

It will be understood that although the terms first, second, etc., may be used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) and phrases used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/−twenty percent (20%). The terms "about," "somewhat," "substantially," etc., with respect to structural or functional inter-relations or aspects, apart from values or numbers, are used to convey that an absolute inter-relation is not required, so as the elements satisfy the described purpose within such inter-relation.

Valve design varies considerably, with many gate or globe valves operated by a moving stem or spindle that actuates or effects the motion of the gate, plug, disc, etc. Conventionally, as noted above, cryogenic valves have been designed to handle the extremely cold temperatures of cryogenic fluid. PTFE guide bushings have been generally used to guide extended stems or spindles as it moves within an inner passage defined by an inner surface of the valve bonnet, which then maintains proper alignment of the sealing or controlling plug of the valve. Proper alignment aids in the proper operation and sealing of the valve.

Most materials expand when heated and contract when cooled. PTFE, for example, contracts or shrinks in extremely low temperatures. The application of steam at high temperatures to a cryogenic valve, conversely, causes the PTFE bushing to expand. While in other respects PTFE performs well with such temperatures, thermal expansion of conventional designs can cause the bushing to interfere with other valve components, even to the point of failure. Reducing the proportions of a bushing may avoid such interference, but introduces a challenge in preserving proper alignment for the full range of temperatures. For example, in some embodiments, reducing the proportions of a bushing may create lateral gaps between the bushing and the valve bonnet when the bushing contracts. Lateral or transverse gaps can contribute to misalignment of valve components.

While the present approach described here is for particular application with a PTFE or stainless steel bushing of a cryogenic valve, the principles may be adapted to other structures or materials in which a variance in thermal conductivity necessitates the use of a positioning device for operation.

For consistency in reference in showing the inter-relation of components, FIG. 1 illustrates a cross section of valve assembly 100 and substantially orthogonal axes, with a first axis 2 shown substantially orthogonal to a transverse plane formed by second axis 4 and third axis 6. However, the orientation of a particular embodiment might vary significantly, depending on the embodiment. In other words, first axis 2 being shown vertically in FIG. 1, an embodiment might have first axis 2 in a horizontal or other disposition.

In some embodiments, a cryogenic valve assembly 100 may be provided that includes a valve bonnet 70 that has an inner surface 72 that defines or faces an inner passage 74. The bonnet inner passage 74 may have a passage length 74A along a first axis 2 and a passage cross section or width 74B along substantially orthogonal transverse second and third axes. The assembly 100 may have a valve stem 30 sized to be movably disposed within the inner passage 74 of the valve bonnet 70. The movement of stem 30 may be longitudinal, i.e., translational, along first axis 2, for example, or rotationally about first axis 2. The valve stem 30 has a stem length 30A along the first axis 2 and is generally configured to operably move relative to the first axis 2. The valve stem 30 has a transverse stem width 30B that is less than the passage width 74B. Included with the assembly 100 is a guide bushing 10 disposed, affixed, or otherwise arranged on or about the valve stem 30, which may be by securing or mounting in a concentric or surrounding manner. Alternatively, bushing 10 and stem 30 may be integrated or manufactured as a sub-assembly 50, optionally with bushing 10 affixed to valve stem 30.

The guide bushing 10 may have a transverse bushing width 10B that is greater than the stem width 30B but less than the passage width 75B of the inner passage 74. These components would define a transverse gap 40 between the guide bushing 10 and the bonnet inner surface 72. The guide bushing 10 may have or present at least one outer surface 15 that may face at least a portion of the inner surface 72 of bonnet 70. A ball nose assembly 20 may be at least partially disposed in at least one of the at least one outer surface 15 of guide bushing 10. At least a portion of the ball nose assembly 20 may extend at least partially into the transverse gap 40. The aspect of extending into the transverse gap 40 enables the maintenance of transverse alignment of the valve stem 30 relative to the bonnet 70, as discussed further below. Embodiments of the present approach may take the form of a cryogenic valve stem sub-assembly 50 with such a valve stem 30 and guide bushing 10, or of a guide bushing 10 for use in such a cryogenic valve.

In some embodiments, guide bushing 10 (or other similarly functioning component) of a cryogenic valve assembly 100 may be of a desired transverse cross section or shape, limiting the points of contact of bushing 10 on inner surface 72. Thus, a bushing 10 may be oriented or disposed along a portion (i.e., less than entire length) of the spindle or stem 30, with the bushing 10 extending somewhat transversely beyond the stem 30 surface or width to present a low friction outer surface 15 that interacts and/or makes contact with the inner surface 72 of the bonnet 70. Embodiments of a cryogenic valve guide bushing 10 may define one or more cavities 12 in the bushing outer surface(s) 15. The cavities 12 may be somewhat aligned along the axis of any gaps or openings exposed or formed in thermal contraction, such as along a lateral or transverse axis (4, 6) as described above, such as transverse gap 40. In such a configuration, the cavities 12 may be distributed about the circumference of a lateral or transverse cross section of guide bushing 10, for example. In some embodiments, a bushing 10 may have four cavities 12 radially configured or separated 90-degrees apart.

A low friction contact or point, such as a ball nose assembly 20, may be inserted within the one or more cavities 12. Where an embodiment of a bushing 10 has multiple sides or outer surfaces 15, a ball nose assembly 20 may be inserted within the one or more cavities 12 in one or more of the sides or surfaces. A ball nose assembly 20 may comprise a body 22, a bearing point 24, and a resilient element 26. In some embodiments, the body 22 may comprise a cylindrical member having an inner annulus or other void. A body outer surface may optionally be threaded or otherwise machined for engagement with the bushing 10 within the cavity 12. Some embodiments of the assembly 20 having cylindrical bodies 22 may also have a resilient element 26 in the form of a spring mounted within the body 22 inner annulus, for example, and configured such that bearing point 24 may expand outward from the body 22 unless depressed. A bearing point 24 may also be moveably mounted within the body 22 at a point outward from the resilient element 26. In such a configuration, the resilient element 26 and bearing point 24 may operate as a plunger when disposed within the bushing 10. Thermal contraction of the bushing 10 would expose or increase the transverse gap 40 described above, and release the compression of the resilient element 26. The ball nose assembly 20 may thus be configured or machined so as to permit the bearing point 24 to extend (or "plunge") relatively outwardly as the bushing 10 undergoes thermal contraction. The bearing point 22 is preferably low friction, such as a bearing or ball rotatably mounted within the ball nose assembly 20. The bearing point 22 (e.g., ball) may glide or roll against an inner wall or surface 72 of bonnet 70 when stem 30 is movably disposed within the inner passage 74.

Use of the ball nose assembly 20 with a bushing 10 thereby overcomes or addresses the dimensional changes occurring from thermal expansion and contraction, including that due to the extreme 750-F degree changes in temperature from steam to liquid nitrogen. By overcoming the thermal expansion and contraction of the guide bushing 10, one may achieve proper alignment of stem 30 relative to bonnet 70 (as well as a sealing plug or disk with a valve body), which enables a pneumatic valve suitable for use with both media, steam and liquid nitrogen.

In some embodiments, one or more stainless steel guide bushings 10 are disclosed. A stainless steel bushing 10 may have a desired shape with respect to the physical profile of inner passage 74, such as a transverse or cross section square shape with excised corners or chamfered corners 17 within bushing outer surfaces 15. In some embodiments, one or more ball nose assemblies 20 may be disposed within chamfered corners 17, configured to make contact with the inner surface 72 of valve bonnet 70. This may minimize the contact area between the bushing 10 and the bonnet 70, thereby reducing the frictional force and the potential for galling. This embodiment also allows low friction motion or rolling of the bearing points 24 in the ball nose assemblies 20. The ball nose assemblies 20 (or detents) may be housed in guide bushing cavities 12 in each of the excised corner-sides or chamfered corners 17. This allows for minimal contact or friction between the bushing 10 and bonnet 70, yet addresses expansion and contraction issues with having a bushing 10 made of a different material (e.g., PTFE) from the bonnet 70. In these embodiments, the at least one ball nose assemblies 20 may comprise four ball nose assemblies 20 spaced radially 90-degrees apart. At the same time, the transverse alignment of stem 30 may be maintained relative to bonnet 70.

In some embodiments, the bushing 10 may include a desired polygonal transverse shape, with for example, three or six sides forming guide bushing outer surfaces 15 in a general triangular shape or, optionally, triangular also having chamfered corners 17 (or excised corner-sides) to make six sides, with each chamfered corner 17 having a ball nose assembly 20. In a triangular embodiment, the ball nose assemblies 20 comprise at least three ball nose assemblies 20 spaced radially 120-degrees apart. Any number of sides to outer surfaces 15 and/or ball nose assemblies 20 may be contemplated, depending on the application and profile. It is desirable to have a minimal amount of contact points between the bushing 10 and inner surface 72 of the bonnet. Thus, the transverse or cross section shape of bonnet 10 may advantageously be configured so as to reduce the potentially contacting or galling points of bushing outer surface 15.

In some embodiments, the bushing 10 may include a small or great plurality of sides to outer surfaces 15, which some (i.e., not necessarily all) of the sides including ball nose assemblies 20. In many embodiments, the ball nose assemblies 20 may be positioned at outer edges or corners of the bushings 10, or wherever the closest contact may be made with the inner surface 72 of the bonnet 70. With the valve stem 30 generally sized with a width or cross-section diameter being smaller that the cross-sectional circumference of the bonnet's inner passage 74, the space or transverse gap 40 between the stem 30 when inside the bonnet 70 may be occupied by the bushing 10 and its ball nose assemblies 20 at various temperatures.

Figure 3:
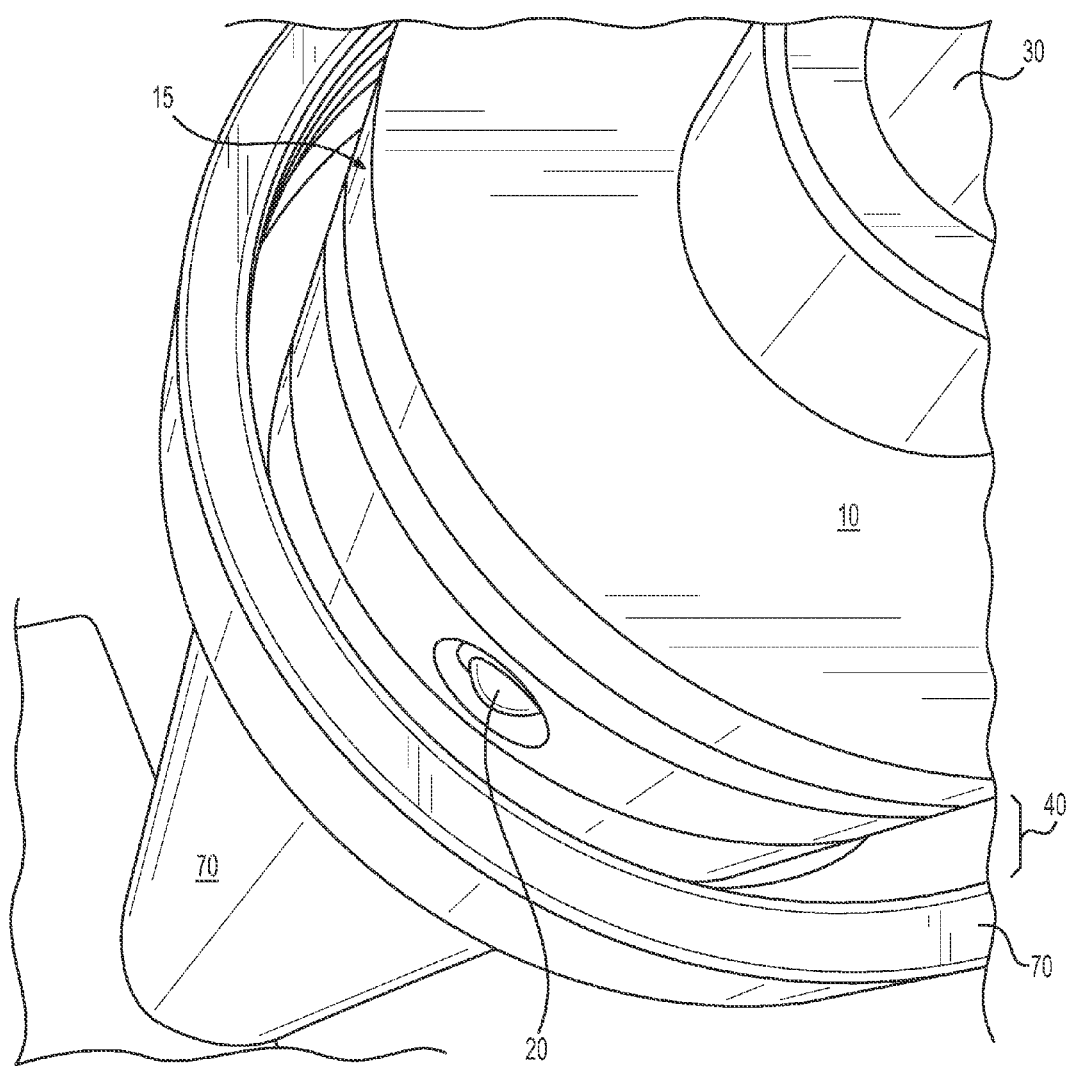
FIG. 3 shows a close-up of a bushing, stem, and bonnet according to some embodiments.
Figure 4:
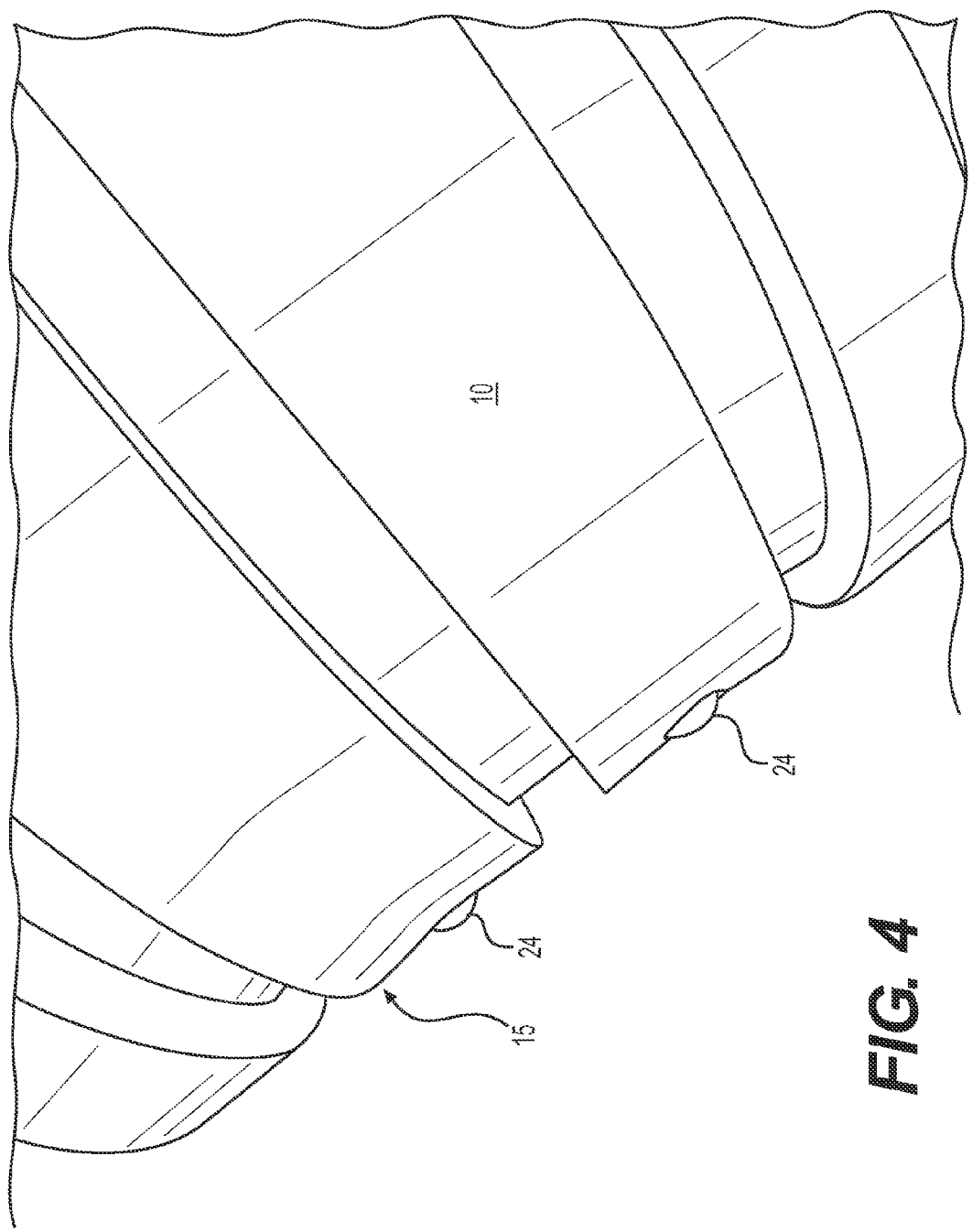
FIG. 4 is a close-up view of a bushing according to some embodiments.
Figure 5:
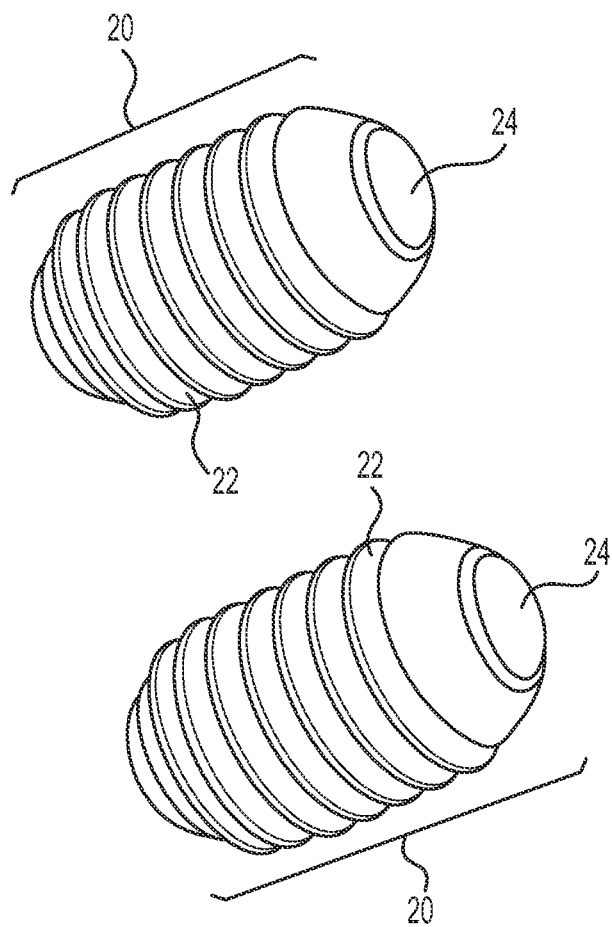
FIG. 5 is a close-up view of two ball nose assemblies according to some embodiments.
Figure 7B:
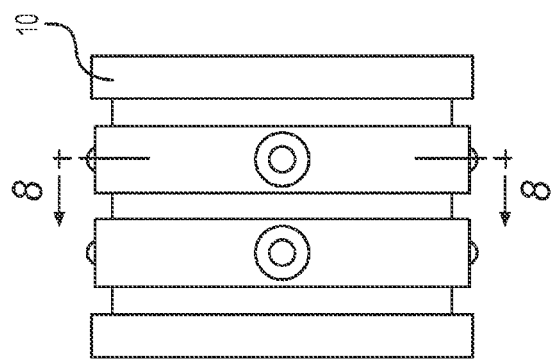
FIGS. 7A-7D are schematic views of several details according to some embodiments.
Figure 7D:
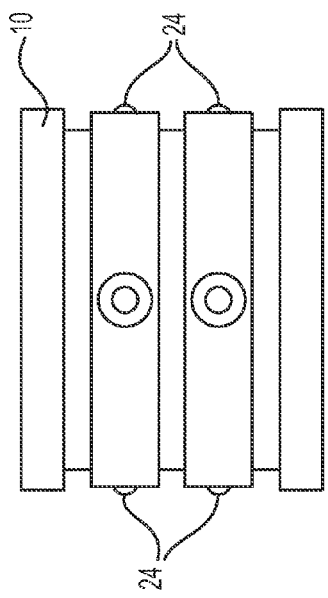
Figure 7A:
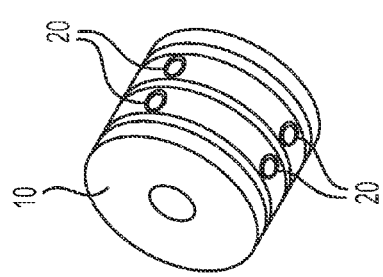
Figure 7C:
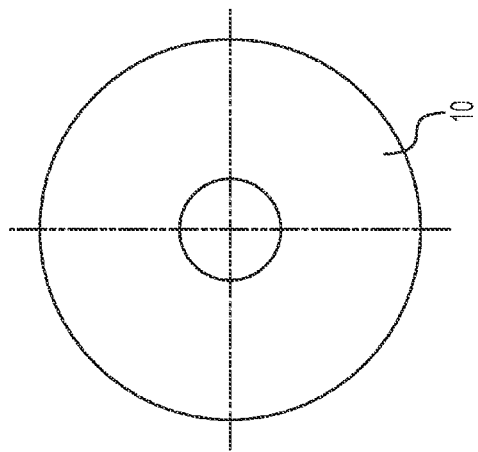

With specific reference to FIGS. 2-14, FIG. 2 is an image of a spindle or stem 30 disassembled from a cryogenic valve bonnet 70. In this embodiment, the stem 30 includes a PTFE guide bushing 10. Embodiments of the ball nose assembly 20 may be seen in bushing 10. FIG. 3 is a view of the stem 30 and bushing 10 inserted into an extended cryogenic valve bonnet 70. The relation of a ball nose assembly 20 to the bonnet 70 is illustrated. A portion of gap 40 may be seen, with bonnet 70 narrowing below. FIG. 4 is an enlarged side view showing the outer surface 15 of a bushing 10 having bearing points 24 of ball nose assembly 20. In this prototype embodiment, there were eight ball nose assemblies 20 within each bushing 10. Four ball nose assemblies 20 were mounted together, forming two visible sets of four with each distributed 90-degrees radially/axially. Note the extension of the bearing point 24 in the form of a ball beyond the guide bushing outer surface 15. In this embodiment, the plunger action provides a deflection of about 0.048 inches per ball nose assembly 20, such that this configuration offers a lateral deflection total of 0.096 inches (i.e., to address or extend into transverse gap 40 in maintaining alignment relative to bonnet 70 during temperature changes). For this embodiment, thermal expansion and contraction was effectively managed with the modified PTFE bushings 10 as shown. FIG. 5 is an enlarged view of two sample ball nose assemblies 20 prior to installation into a bushing 10, illustrating assembly body 22 and bearing point 24.

FIGS. 6A-6C show portions or aspects of an embodiment of a cryogenic valve assembly 100 with an extended bonnet 70, and illustrating the present approach for addressing gaps due to thermal contraction of the bushings 10. FIG. 6B is a view of the cross section of an extended valve stem subassembly 50 within bonnet 70, illustrating stem 30 with two PTFE bushings 10 (cross hatched) inside the extended bonnet 70. The detail in FIG. 6C is an enlarged view of a portion of this embodiment, showing two installed ball nose assemblies 20 with bearing points 24. As shown, bushing 10 includes bearing points 24 contacting with bonnet inner surface 72 of bonnet 70. Some of the details of the assemblies or sub-assemblies shown include guide bushing cavities 12, ball nose assembly 20 bodies 22 with threaded outer surfaces and inner annulus, and the spherical or ball bearing points 24 projecting beyond the outer surface 15 of the bushing 10.

Figure 8:
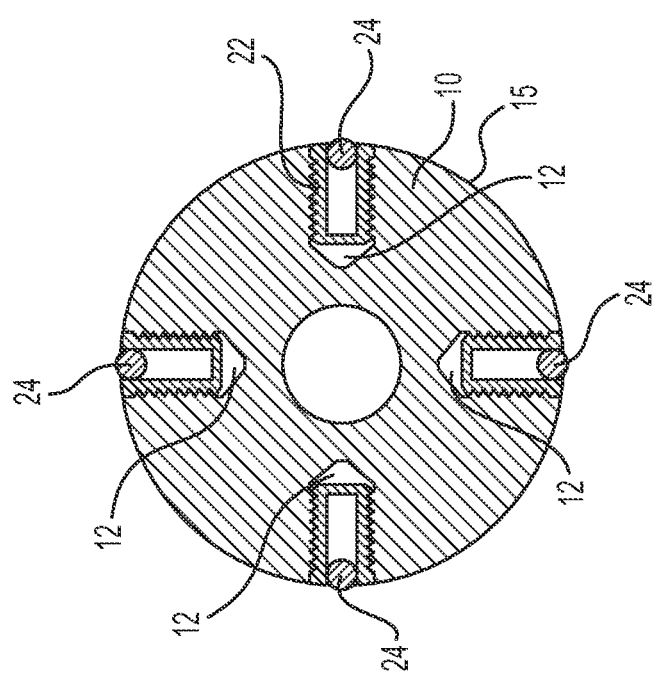
FIG. 8 is a cross sectional detail of a bushing.
Figure 10A:
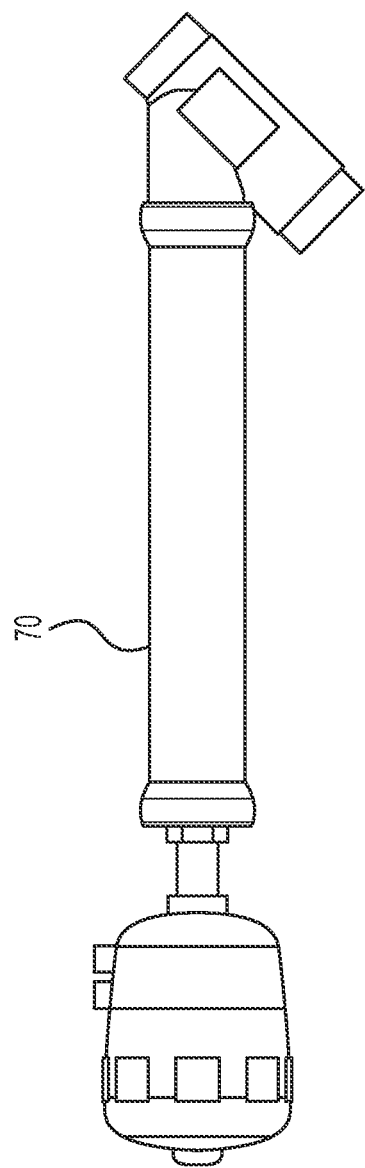
FIGS. 10A and 10B are schematics of an assembled cryogenic valve according to some embodiments.
Figure 10B:
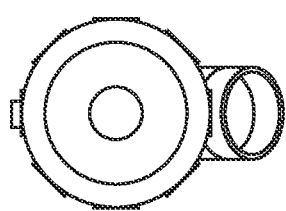

FIGS. 7A-7D and FIG. 8 are schematics of various views of embodiments of bushings 10 with ball nose assemblies 20 installed. In some embodiments, as was shown in FIG. 6B, two bushings 10 may be mounted on a stem 30. The bearing points 24 in FIG. 7D and in cross section view of FIG. 8 are shown extending beyond the outer surface 15 of the bushings 10. FIGS. 9A-9D are schematics of a similar embodiment with bushings 10 installed onto an extended valve stem 30, forming valve stem sub-assembly 50, with FIG. 9C being a cross section of detail Section C-C. FIG. 9D is an end view, i.e., along first axis 2, for example. For completeness, FIGS. 10A-10B illustrate an assembled, inclined cryogenic valves, with assembly 100 inserted within extended bonnet 70.

Figure 11:
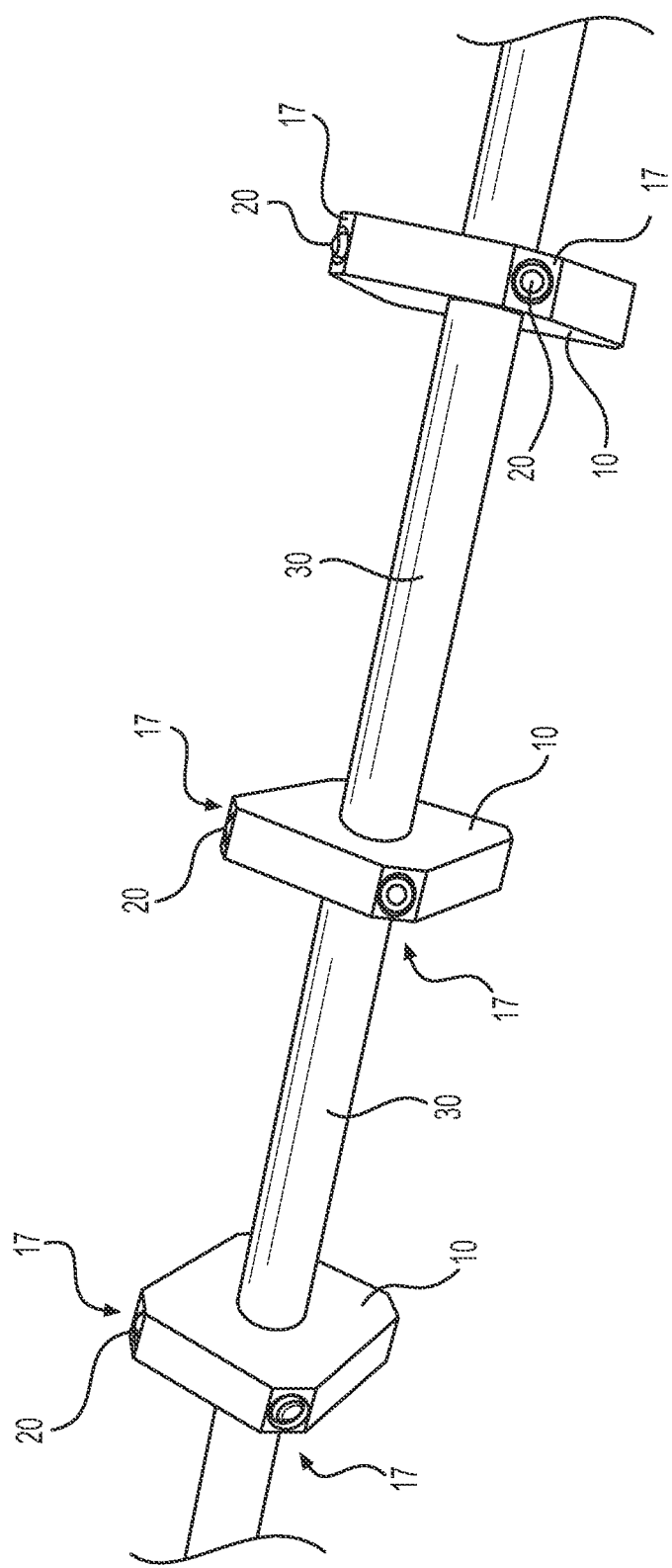
FIG. 11 is a close-up view a bushing and stem subassembly according to some embodiments.

FIG. 11 is an image of a spindle or stem 30 without the valve bonnet 70 (i.e., not shown). For this embodiment, three stainless steel bushings 10 are shown on the stem 30. Each bushing 10 may be relatively square in cross-sectional or transverse shape, relative to a view down the first or longitudinal axis of the stem 30, with the corners of the square shape excised or chamfered to make an octagonal shape or square with chamfered corners 17. The chamfered corners/excised corner-sides 17 are much smaller, and meet the larger square sides at approximately 45 degree angles. In this embodiment, each chamfered corner 17 has a ball nose assembly 20 embedded or disposed in the side or portion of outer surface 15 for extending into transverse gap 40 and making contact with the inner wall 72 of a cryogenic valve bonnet 70. As such, each embodiment of such a bushing 10 has four ball nose assemblies 20 on each of the chamfered corners 17 of the relatively square cross-section or transverse shaped bushing 10, which maintains the transverse alignment of stem 30 relative to bonnet 70. This configuration includes ball nose assemblies 20 spaced radially 90-degrees apart.

Figure 12:
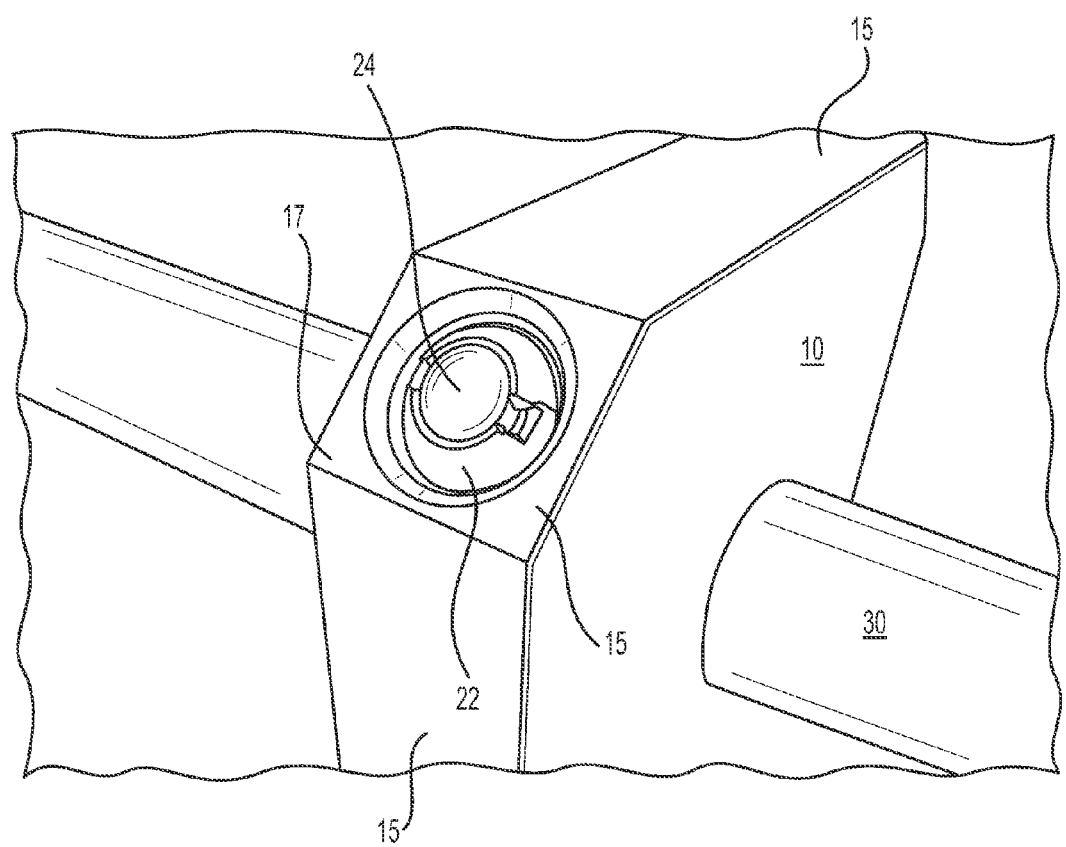
FIGS. 12 and 13 are a close-up views of aspects of a bushing and assemblies according to some embodiments.
Figure 13:
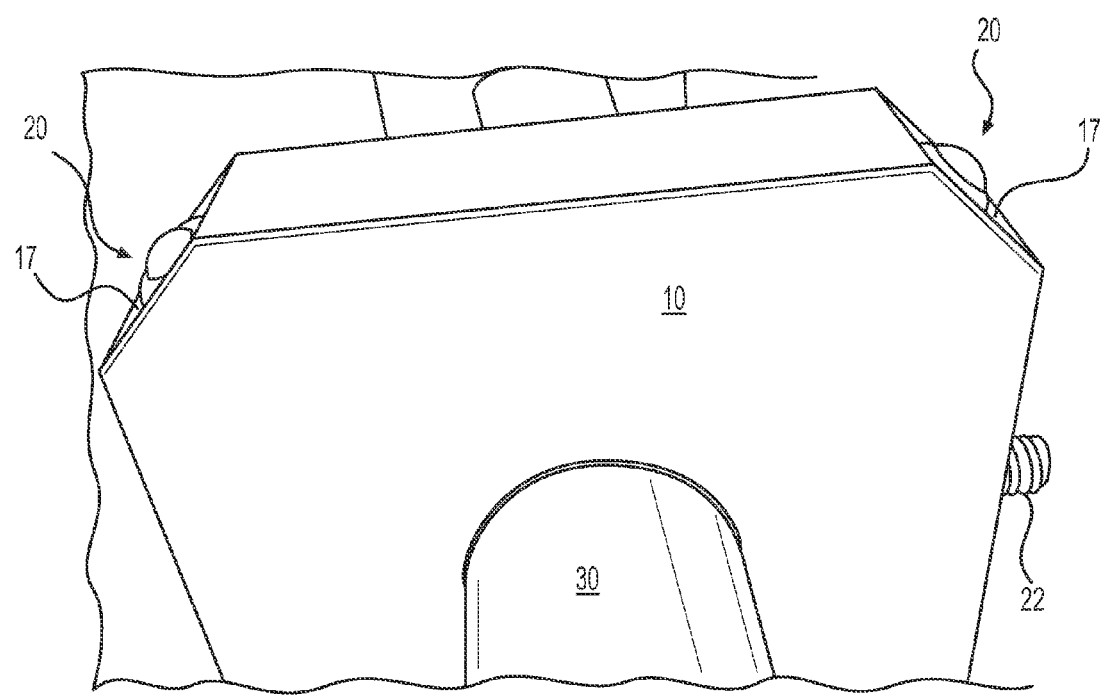
Figure 14C:
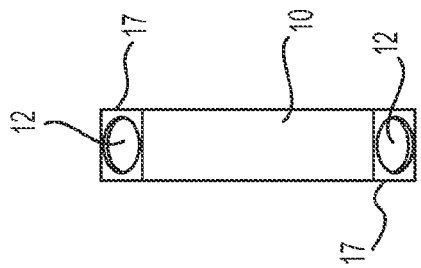
FIGS. 14A-14E are several views of an embodiment of guide bushing.
Figure 14B:
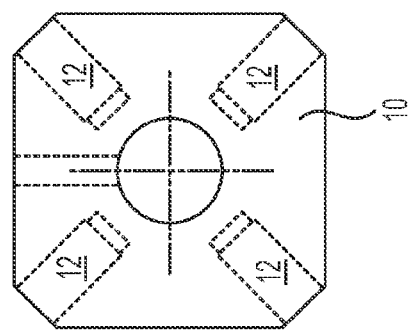
Figure 14A:
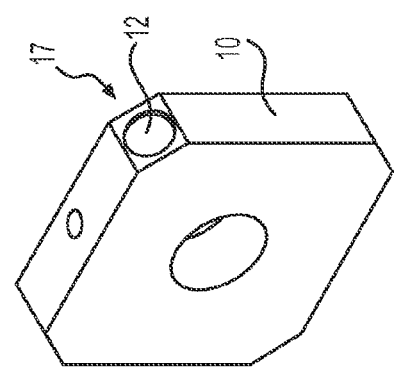
Figure 14E:
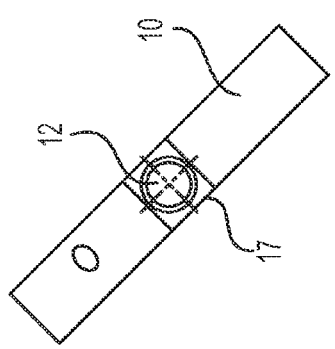
Figure 14D:
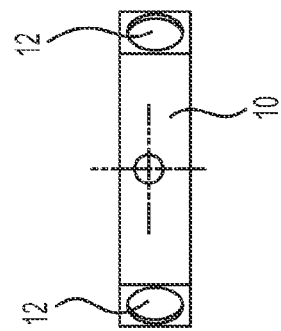

FIGS. 12 and 13 disclose a close-up view of a ball nose assembly 20 disposed within one chamfered corner 17 of the relatively transverse square block of the stainless steel bushing 10. Installation notches may be seen on each side of the body 22 of the ball nose assembly 20. FIG. 13 discloses a top, close-up view of the stem 30 and bushing 10 looking down the axis of the stem 30 at the bushing 10. The bearing points 24 extend radially outward from the bushing's outer surface 15 at top chamfered corners 17 (and, when installed, into transverse gap 40).

FIGS. 14A-14E are schematics of various perspectives of a relatively square stainless steel guide bushing 10, according to one embodiment of the present approach, with cavities 12 in the bushing 10 chamfered corner 17 outer surface 15 for housing the ball nose assemblies 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A cryogenic valve assembly for use in a fluid system using cryogenic fluid and steam, the assembly comprising:
   a valve bonnet having an inner surface defining an inner passage with a passage length along a first axis and a passage width along substantially orthogonal transverse second and third axes;
   a valve stem sized to be movably disposed within the inner passage of the valve bonnet, the valve stem having a stem length along the first axis and configured to operably move relative to the first axis, the valve stem having a transverse stem width less than the passage width;
   a guide bushing disposed on the valve stem, said guide bushing having a transverse bushing width greater than the stem width and less than the passage width so as to define a transverse gap between the guide bushing and the bonnet inner surface, the guide bushing comprising at least one outer surfaces facing at least a portion of the inner surface;
   a ball nose assembly at least partially disposed in the at least one outer surfaces, wherein said ball nose assembly comprises a body, a bearing point, and a resilient element; and
   wherein the valve assembly is configured such that when the stem and guide bushing undergo thermal contraction at least a portion of said ball nose assembly extends at least partially into the transverse gap so as to maintain a proper alignment of said valve stem.

2. The cryogenic valve assembly of claim 1, wherein said guide bushing is made from stainless steel.

3. The cryogenic valve assembly of claim 1, wherein said guide bushing is made from PTFE.

4. The cryogenic valve assembly of claim 1, wherein said bearing point comprises a bearing ball configured to make contact with said inner surface of said valve bonnet.

5. The cryogenic valve assembly of claim 1, wherein said at least one outer surface comprises a plurality of outer surfaces and said at least one ball nose assembly comprises a plurality of ball nose assemblies with each ball nose assembly disposed in a separate one of said plurality of outer surfaces.

6. The cryogenic valve assembly of claim 5, wherein said plurality of ball nose assemblies are distributed transversely about the first axis within the plurality of outer surfaces of said guide bushing.

7. The cryogenic valve assembly of claim 5, wherein said guide bushing has a transverse shape of a square with four chamfered corners so that the plurality of outer surfaces form four outer surfaces at the chamfered corners and the plurality of ball nose assemblies comprise four ball nose assemblies spaced radially 90-degrees apart at the chamfered corners.

8. The cryogenic valve assembly of claim 4, wherein the stem is configured to operably move relative to the first axis by translation along the first axis, and wherein said bearing point comprises a bearing ball configured to make contact with said inner surface of said valve bonnet such that said plurality of ball nose assemblies are configured to maintain transverse alignment of the valve stem relative to said bonnet.

9. The cryogenic valve assembly of claim 1, wherein said alignment of said valve stem is maintained over an operational temperature range of at least about 750 degrees Fahrenheit.

10. A valve stem sub-assembly for use in a cryogenic valve, the cryogenic valve having a valve bonnet with an inner surface, the cryogenic valve for use in a fluid system using cryogenic fluid and steam, the valve stem sub-assembly comprising:

a valve stem having a stem length along a first axis and a transverse stem width along substantially orthogonal transverse second and third axes;

a guide bushing affixed to the valve stem, said guide bushing having a transverse bushing width greater than the stem width so as to be arranged transversely about the stem, the guide bushing including at least one outer surface along the first axis and a transverse axis;

a plurality of ball nose assemblies at least partially disposed in the at least one outer surface, the plurality of ball nose assemblies comprising a body, a bearing point, and a resilient element, the bearing point extending radially outward beyond said at least one outer surface of said guide bushing; and wherein, wherein the valve stem sub-assembly is configured such that when the stem and guide bushing undergo thermal contraction, said plurality of ball nose assemblies are configured so that the bearing point may contact the inner surface of the valve bonnet to maintain transverse alignment of the valve stem.

11. The cryogenic valve stem sub-assembly of claim 10, wherein said plurality of ball nose assemblies comprise three ball nose assemblies spaced radially 120-degrees apart.

12. The cryogenic valve stem sub-assembly of claim 10, wherein said plurality of ball nose assemblies comprise four ball nose assemblies spaced radially 90-degrees apart.

13. The cryogenic valve stem sub-assembly of claim 12, wherein said guide bushing has a transverse shape of a square with four chamfered corners so that the plurality of outer surfaces form four outer surfaces at the chamfered corners and the plurality of ball nose assemblies comprise four ball nose assemblies spaced radially 90-degrees apart at the chamfered corners.

14. The cryogenic valve assembly of claim 10, wherein said guide bushing is made from stainless steel.

15. The cryogenic valve assembly of claim 10, wherein said guide bushing is made from PTFE.

16. A guide bushing for use in a cryogenic valve, the cryogenic valve having a valve bonnet with an inner surface defining an inner passage, the inner passage having a passage length along a first axis and a passage width along substantially orthogonal transverse second and third axes, the cryogenic valve further having a valve stem sized to be movably disposed within the inner passage of the valve bonnet, the valve stem having a stem length along the first axis and configured to operably move relative to the first axis, the valve stem having a transverse stem width less than the passage width, the cryogenic valve for use in a fluid system using cryogenic fluid and steam, the guide bushing comprises:

a stainless steel guide bushing configured to be disposed on the valve stem, said guide bushing having a transverse bushing width greater than the stem width and less than the passage width so as to define a transverse gap between the guide bushing and the bonnet inner surface, the guide bushing comprising a plurality of outer surfaces facing at least a portion of the inner surface;

a ball nose assembly at least partially disposed in at least one of said plurality of outer surfaces;

wherein the valve is configured such that when the stem and guide bushing undergo thermal contraction, at least a portion of said ball nose assembly is configured to extend at least partially from at least one of the outer surfaces and into the transverse gap so as to maintain a proper alignment of said valve stem; and wherein said ball nose assembly comprises a body, a bearing point, and a resilient element, said resilient element mounted within an interior of said body, said bearing point moveably mounted within said body interior at a point outward of said resilient element.

17. The guide bushing of claim 16, wherein the stainless steel guide bushing and ball nose assembly are configured such that said alignment of said valve stem is maintained over an operational temperature range of at least about 750 degrees Fahrenheit.

* * * * *